(12) United States Patent
Goulbourn et al.

(10) Patent No.: US 9,139,704 B2
(45) Date of Patent: Sep. 22, 2015

(54) POLYMERIC MATERIALS

(75) Inventors: John Goulbourn, Liverpool (GB);
Andrew Stuart Overend, Bolton (GB);
Christine Leeming, Manchester (GB);
James Leeming, legal representative, Manchester (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 27 days.

(21) Appl. No.: 13/996,578

(22) PCT Filed: Dec. 19, 2011

(86) PCT No.: PCT/GB2011/052516
§ 371 (c)(1),
(2), (4) Date: Sep. 4, 2013

(87) PCT Pub. No.: WO2012/085548
PCT Pub. Date: Jun. 28, 2012

(65) Prior Publication Data
US 2013/0338308 A1    Dec. 19, 2013

Related U.S. Application Data

(60) Provisional application No. 61/425,540, filed on Dec. 21, 2010.

(51) Int. Cl.
*B01F 17/00* (2006.01)
*D01F 1/02* (2006.01)
*C09K 3/00* (2006.01)
*C08J 3/20* (2006.01)
*C08J 3/205* (2006.01)

(52) U.S. Cl.
CPC ............... *C08J 3/201* (2013.01); *C08J 3/2053* (2013.01); *C08J 2367/00* (2013.01)

(58) Field of Classification Search
None
See application file for complete search history.

(56) References Cited

U.S. PATENT DOCUMENTS

| 6,403,728 | B1 | 6/2002 | Al Ghatta et al. | |
| 6,447,711 | B1 * | 9/2002 | Al Ghatta et al. | 264/537 |
| 2002/0077449 | A1 * | 6/2002 | Nichols et al. | 528/272 |
| 2007/0140045 | A1 | 6/2007 | Becht et al. | |
| 2011/0272641 | A1 | 11/2011 | Bastiaens et al. | |

FOREIGN PATENT DOCUMENTS

| JP | 2002292721 A | 10/2002 |
| JP | 2006524148 A | 10/2006 |
| JP | 2007513227 A | 5/2007 |
| JP | 2008169239 A | 7/2008 |
| WO | WO 2004/094122 A1 | 11/2004 |
| WO | WO 2010/116161 A1 | 10/2010 |
| WO | WO 2010/117268 A1 | 10/2010 |
| WO | WO2012/085548 A3 | 6/2012 |

OTHER PUBLICATIONS

Product information sheet for Edenol 1215, Jul. 27, 2009, pp. 1-2.*

* cited by examiner

*Primary Examiner* — Susannah Chung
*Assistant Examiner* — Robert T Butcher
(74) *Attorney, Agent, or Firm* — Fay Sharpe LLP

(57) ABSTRACT

A method of introducing an additive, for example a dye, into a polymeric material comprises using a liquid formulation comprising the additive, a vehicle and an active compound added to increase the melt viscosity of the polymeric material. The active compound may be a multi-functional anhydride. The liquid formulation is suitably contacted with the polymeric material in a melt processing apparatus and suitably a cavity transfer mixer is used in the process. A fiber is suitably subsequently produced.

17 Claims, 1 Drawing Sheet

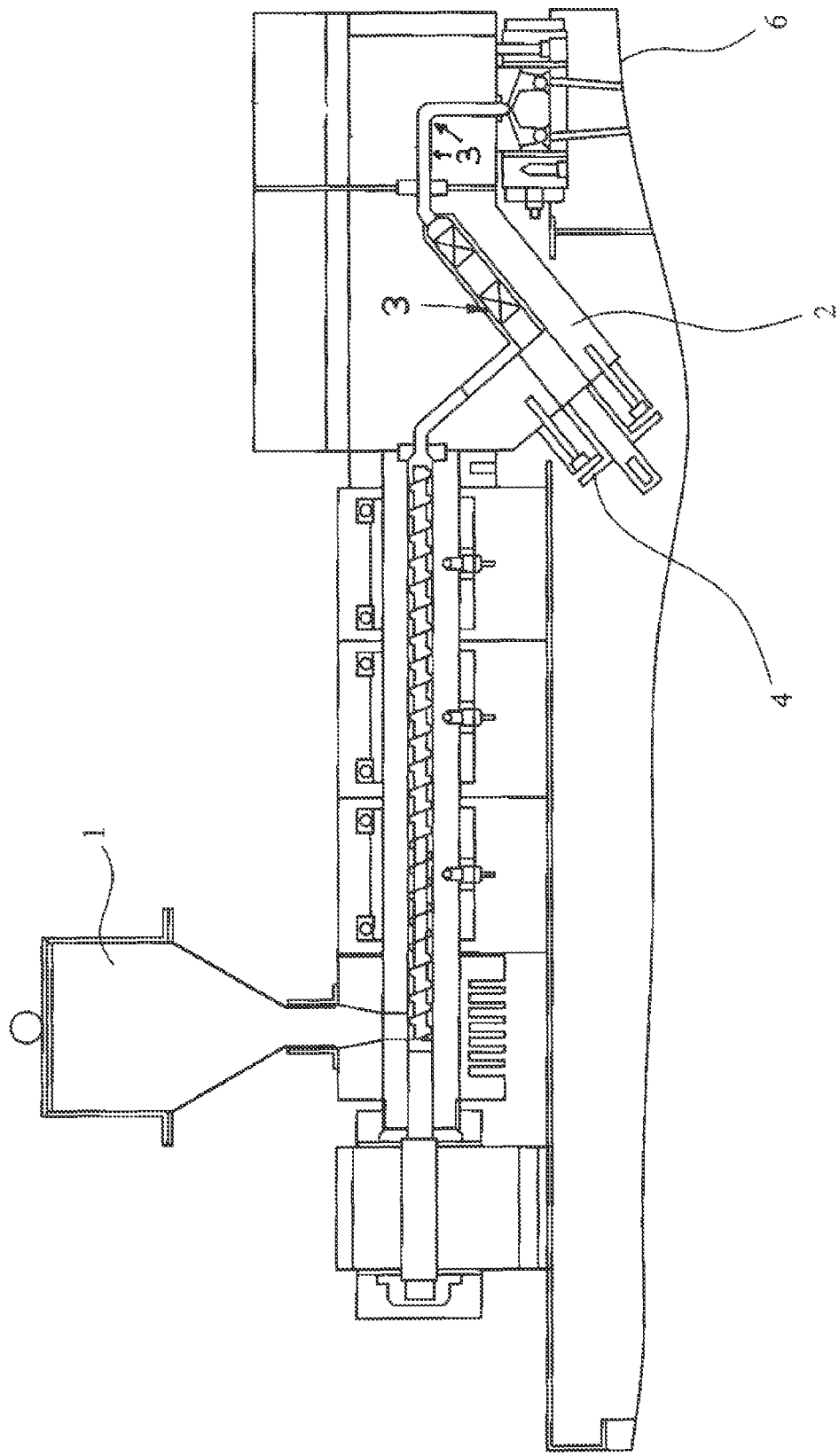

POLYMERIC MATERIALS

This invention relates to polymeric materials and particularly, although not exclusively, relates to incorporation of additives into polymeric materials, for example polyesters, such as in polyester fibre production.

It is known to incorporate additives, (e.g. colorants, stabilizers, anti-static agents, optical brighteners, processing aids etc.) into fibres post-production by bath dyeing or spin dyeing. However disadvantageously, some methods require large volumes of liquid additive formulations to enable the additive to permeate into the fibre; the process can be time-consuming; and the fibre must be dried following the permeation process.

It is also known to use a masterbatch containing additives to introduce the additives into a polymer. For example pellets of the masterbatch and pellets of the polymer may be introduced into an extruder via its feedthroat and the two components melt-processed together. Disadvantageously, however, cleaning of the extruder is time-consuming, since the entire length of the extruder needs cleaning between, for example colour changes; and dosing and handleability of solid pelletized masterbatch can be challenging. In addition, some properties of materials, for example spun fibre, made using masterbatches, may be detrimentally affected.

A preferred method of incorporating additives would be incorporation of a liquid into a polymer melt. This may be achieved using a formulation comprising a carrier medium or vehicle in which the additive is dispersed prior to injection into the melt. However, disadvantageously, it is found that use of the formulation may lead to polymer and/or vehicle degradation, die head pressure drop, fuming at the die head and/or poor properties of the polymeric material after incorporation of the additive.

It is an object of the present invention to address the aforementioned problems.

According to a first aspect of the invention, there is provided a method of introducing an additive into a polymeric material comprising:

selecting a liquid formulation comprising an additive (for example a colourant), a vehicle and an active compound added to increase the melt viscosity of the polymeric material; and contacting the liquid formulation with said polymeric material in a melt-processing apparatus.

To assess whether an active compound increases the melt viscosity of the polymeric material during melt-processing, a comparison may be made between a liquid formulation which includes the active compound and one which does not include the active compound but is an otherwise identical liquid formulation. Melt viscosity in each case can be assessed to confirm the melt viscosity of the polymeric material is higher when the active compound is used compared to when no such active compound is used.

Preferably, said polymeric material comprises a synthetic thermoplastic polymer. Said polymeric material is preferably able to be formed into fibres. Said polymeric material may be a condensation polymer, for example a condensation polymer which may depolymerise in the presence of water and/or a carrier with appropriate functional groups (which could include but is not limited to hydroxyl and carboxylic acid species). Said polymeric material may be selected from polyesters, polyamides, polypropylene, polycaprolactone, polycarbonates, acrylics and aramids.

Examples of polyamides include aliphatic PA6 and PA6,6, semi-aromatic polyphthalamides (e.g. PA 6T) and aromatic polyamides in which at least 85% of the amide linkages, (—CO—NH—) are attached directly to two aromatic rings—for example the para-aramids.

Said polymeric material preferably comprises a polyester which may be selected from poly(ethylene terephthalate) (PET), poly(butylene terephthalate) (PBT), poly(trimethylene terephthalate) (PTT), poly(ethylene naphthalate) (PEN), poly(1,4-cyclo-hexylenedimenthylene) terephthalate (PCT), poly(ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate) (PETA), poly(lactic acid) (PLA), poly(glycolic acid) (PGA) and their blends of copolymers. Said polymeric material preferably comprises, more preferably consists essentially of PET.

A typical spinnable condensation polymer such as polyester, for example PET, may have up to 250 or up to 200 repeat units (e.g. molecular weight of up to 25,000 or up to 20,000). The number of repeat units may be in the range 50-200, suitably 75-200, preferably 75-125 repeat units. A typical spinnable polymer may have about 100 repeat units. The condensation polymer may be linear and be able to reach the high levels of orientation and crystallinity which are induced during spinning and drawing processes.

Typical spinnable polyesters have an IV in the range 0.62 to 1 dl/g. Preferred polyesters have an IV within the range of 0.5 to 1.2 dl/g when measured using standard techniques (for example ASTM D4603-03).

Said additive may be selected from colourants, stabilizers, delusterants, anti-static agents, optical brighteners, processing aids, light reflective additives, anti-soil additives, friction modifiers, anti-oxidants, insecticides and anti-flammability additives. Said additive preferably comprises a colourant. A said colourant may be a dye or pigment. A dye may be especially preferred.

Said liquid formulation may include less than 80 wt %, suitably less than 70 wt %, preferably less than 65 wt %, more preferably less than 60 wt % of a said additive (e.g. a colourant). Typically, said formulation includes 5-80 wt % of a said additive (e.g. a colourant). The total amount of additives (selected from colourants, stabilizers, delusterants, anti-static agents, optical brighteners, processing acids, light reflective additives, anti-soil additives, friction modifiers, anti-oxidants, insecticides and anti-flammability additives) in said formulation may be more than 1 wt %, suitably more than 2 wt %, preferably more than 5 wt %; typically the total amount of additives is in the range 5-80 wt %. In one embodiment, the total amount of additives may be in the range 39-60 wt %. For the avoidance of doubt, the wt % refers to the wt % of additive excluding any vehicle (or the like) with which the additive may be formulated prior to being incorporated into the liquid formulation.

More than one additive may be required (and included in said formulation). For example, a mixture of dyes and/or pigments may be required in order to provide a colormatch to a customer requirement. Other additives which are commonly added to fibre may include light reflectance additives, anti-static or anti-soil species, friction modifiers, anti-oxidants, anti-flammability additives etc. These may be added alone or in a package together with a colored species.

The method may include introducing less than 10 wt %, more suitably less than 5 wt %, preferably less than 4 wt % of a said additive, selected from those described above (preferably a colourant), into said polymeric material via said liquid formulation. At least 1 wt % of a said additive (preferably a colourant) may be introduced via said liquid formulation. The total amount of additives, selected from those described above, introduced into said polymeric material via said liquid formulation may be less than 10 wt %, more preferably less than 5 wt %. Typical amounts of additives introduced using the method described are typically in the range of 0.05-3 wt %.

Said liquid formulation may include at least 20 wt % of vehicle, for example a single type of vehicle. Said formulation may include 60 wt % or less of vehicle, for example a single type of vehicle.

Preferably, the vehicle has good compatibility with said polymeric material. Compatibility of the vehicle with polyester may be assessed by examining the level of haze that is created when mouldings are formed. Further details are provided in the specific examples which follow. The level of haze may be assessed as described in Example 7(v) hereinafter. The vehicle may be such that when measured as described in the aforementioned example (at 1 wt %), the haze level is less than 50%, is suitably less than 30%, is preferably less than 20%, is more preferably less than 10% and, especially, is less than 5%. In some cases, relatively incompatible carriers may be used (e.g. dosed to less than 1 wt % in the polymeric material). These may be used when lighter-coloured fibres are being produced. Other measures of compatibility may be used when alternative thermoplastic polymers are examined.

Preferred vehicles tend not to migrate excessively from polymer moldings once cooled to room temperature.

Preferred carriers give a low or minimum clouding, for example less than 50% haze at levels of up to 5 wt % in the polymeric material.

The method may comprise introducing less than 10%, preferably less than 6% and more preferably less than 4% of vehicle into the polymeric material, via said formulation. The amount introduced may be less than 3 wt %.

Solubility information can be extracted from the structure of the vehicles. Division of Hildebrand parameters into three component Hansen parameters to measure the dispersion, polar and hydrogen bonding forces can be used to discover which are the most preferred vehicle types for use in the method. A total solubility parameter can be calculated as follows:

$$\delta_t = (\delta_d^2 + \delta_p^2 + \delta_h^2)^{1/2}$$

wherein $\delta_t$ represents the total solubility parameter, $\delta_d$ represents the dispersion contribution made by the individual functional groups in the idealised chemical structure, $\delta_d$ represents the polar contribution made by the individual functional groups in the idealised chemical structure and $\delta_h$ represents the hydrogen bonding contribution made by the individual functional groups in the idealised chemical structure, The individual chemical group components may can be taken from several reference books; for example Van Krevelen D. W. and Hoftyzer P. J. Properties of polymer correlations with chemical structure Elsevier 1972 and Hansen C. M. Handbook—"Hansen Solubility Parameters: A User's Handbook", CRC Press 1999].

The difference between the total solubility parameter of the vehicle and the polymeric material itself can then be calculated and the value of the difference gives a measure of 'compatibility'.

A difference of less than 10, preferably less than 8, more preferably less than 5 gives vehicles with the potential to be compatible with the polymeric material. Note, that the difference is calculated by taking the higher solubility parameter and subtracting the lower solubility parameter.

HLB values can also be used to determine the most preferred vehicle types. An HLB value lying between 1 and 22 gives the most preferred vehicle. HLB values are calculated by measuring the molecular weight of the idealised chemical structure of the species and then measuring the molecular weight percentage of the hydrophilic element of the structure. Division of this percentage value by 5 gives the HLB value.

The vehicle may be of a type which is able to interact, for example react, with said polymeric material in a molten state (below its decomposition temperature) to reduce its molecular weight and/or reduce the relative and/or intrinsic viscosity of the polymeric material. When the polymeric material is a polyester (as is preferred), the vehicle and polymeric material may be capable of undergoing a trans-esterification reaction, for example when the polymeric material is in a molten state and the vehicle is contacted with the polymeric material when in such a state.

Typical vehicles may be those which are capable of plasticizing PVC. Said vehicle may suitably be non-aqueous. It may be mineral or vegetable-oil based. Preferably, the vehicle does not substantially degrade during melt-processing after contact of said liquid formulation with said polymeric material. Said vehicle may have a boiling point in the range 200-500° C. and suitably the boiling point is at least slightly higher than the polymer processing temperature.

Said vehicle may be selected from:
adipic acid polymers;
derivatives (e.g. carboxylic acid derivatives) of adipic acid polymers, for example adipate ester polymers;
citrates, for example alkyl citrates, such as tributyl citrates;
phosphate esters, for example tris(2-ethylhexyl)phosphate and 2-ethylhexyldiphenyl phosphate;
phthalates, for example $C_4$ to $C_{13}$ phthalates such as di(2-ethylhexyl)phthalate or di-octylphthalate;
sebacates;
azelates;
chlorinated paraffins with between 20-70% chlorination level;
epoxidized oils (e.g. naturally-occurring oils), for example epoxidized soy bean oil or epoxidized linseed oil;
acetylated hydrogenated castor oils.

A mixture of the above vehicles may be used in the formulation.

Preferred vehicles are selected from adipic acid polymers and their derivatives, phosphate esters, phthalate esters and phthalate ester-type structures and epoxidised oils.

Especially preferred vehicles are adipic acid polymers or derivatives of adipic acid polymers, with adipate ester polymers being especially preferred.

The formulation may optionally include a dispersant which is used to improve the shelf-life and prevent sedimentation of any solid particulates. Said dispersant may comprise a backbone, the function of which is to provide compatibility with the carrier phase and a headgroup which anchors the dispersant onto the surface of the additive. Said dispersant may be selected from single molecule or polymeric species with a range of functionalities within the molecular backbone and anchor groups.

Said liquid formulation may include less than 30 wt %, preferably less than 20 wt %, more preferably less than 10 wt %, especially less than 5 wt % of a said dispersant. A dispersant may not be required if the additive is a dye.

Said active compound is suitably arranged to react and/or interact with the polymeric material to modify its viscosity profile by increasing the melt-viscosity of the polymeric material and/or to stabilise an extrusion and spinning process and/or by improving the properties of fibres made using said formulation and said additive. Said active compound may be selected from the group comprising anhydride, epoxy, melamine, oxazoline, oxazolinone, lactams carbodiimides, polyepoxides isocyanates polyacyllactams, phosphonates etc.

When said active compound is an anhydride, it may be a multi-functional anhydride. Examples include aromatic acid anhydrides, cyclic aliphatic anhydrides, halogenated acid anhydrides, pyromellitic dianhydride, benzophenonetetracarboxylic acid dianhydride, cyclopentanetetracarboxylic dianhydride, diphenyl sulfone tetracarboxylic dianhydride, dioxotetrahydro-3-furanyl)-3-methyl-3-cyclohexene-1,2-dicarboxylic dianhydride, bis(3,4-dicarboxyphenyl)ether dianhydride, bis(3,4-dicarboxyphenyl)thioether dianhydride, bisphenol-A bisether dianhydride, 2,2-bis(3,4-dicarboxyphenyl)hexafluoropropane dianhydride, 2,3,6,7-napthalenetetracarboxylic acid dianhydride, bis(3,4-dicarboxyphenyl)sulfone dianhydride, 1,2,5,6-napthalenetetracarboxylic acid dianhydride, 2,2',3,3'-biphenyltetracarboxylic acid, hydroquinone bisether dianhydride, 3,4,9,10-perylene tetracarboxylic acid dianhydride, 1,2,3,4-cyclobutanetetracarboxylic acid dianhydride, 3,4-dicarboxy-1,2,3,4-tetrahydro-1-naphthalene-succinic acid dianhydride, bicyclo(2,2)oct-7-ene-2,3,5,6-tetracarboxylic acid dianhydride, tetrahydrofuran-2,3,4,5-tetracarboxylic acid dianhydride, 2,2-bis(3,4-dicarboxyphenyl)propane dianhydride, 3,3',4,4'-biphenyltetracarboxylic acid dianhydride, 4,4'-oxydiphthalic dianhydride (ODPA), and ethylenediamine tetraacetic acid dianhydride (EDTAh).

Preferred anhydrides include pyromellitic dianhydride, 1,2,3,4-cyclopentanetetracarboxylic acid dianhydride, 1,2,3,4-cyclobutanetetracarboxylic acid dianhydride and tetrahydrofuran-2,3,4,5-tetracarboxylic acid dianhydride. Most preferably the polyfunctional acid anhydride is pyromellitic dianhydride.

Polyepoxide structures could include bisphenol-A-diglycidylether, bis(3,4-epoxycyclohexylmethyl) adipate, N,N-diglycidyl benzamide (and related species) N,N-diglycidyl nailine and related structures, N,N diglycidylhydantoin, barbituric acid, isocyanuric acid or uracil species, N,N-diglycidyl di-imides, N,N-diglycidyl imidazolones, epoxy novolaks, phenyl glycidyl ether diethyleneglycol diglycidyl ether or Epikote products eg Epikote 815 or Epikote 828. Suitably, the specie used has adequate high temperature stability so as not to degrade at polymer processing temperatures. For polyester, this is typically between 260 and 300° C.

Surprisingly, it is found that use of, for example, the acid anhydride reduces the die head pressure drop associated with the addition of liquid carrier and allows production of polymeric fibre materials incorporating additives within liquid formulations with acceptable tensile properties.

In the method, the liquid formulation is preferably dosed into said polymeric material when said polymeric material is in a molten state. Said polymeric material may be melted in an extruder and said liquid formulation may be contacted with the polymeric material in said extruder or downstream thereof. Said liquid formulation is preferably injected at relatively high pressure (5-120 bar) into the polymeric material. A mixing means is suitably provided for facilitating mixing of the liquid formulation and polymeric material. The mixing means may be provided by using either static or dynamic mixers. Dynamic mixers are preferred in applications where liquid formulations are added to the melt phase of the polymer i.e. where small amounts of low viscosity fluid require mixing with large volumes of high viscosity fluid. Cavity transfer mixers are especially preferred due to the high distributive mixing forces that are applied down the length of the mixer enabling the required high shear process to be applied in a controllable manner. Downstream of the point of contact of liquid formulation and polymeric material, there may be a spinning means for spinning the polymeric material to define fibres. The same general set up could be used to make other articles from thermoplastic polymers; for example sheet or film—the means of exit would be through the relevant die heads.

Said polymeric material which is contacted in the method may be supplied directly from a reactor in which the polymeric material is made in a polymerisation reaction. Thus, said polymeric material used suitably does not comprise pellets or granules or other isolated polymeric material but suitably comprises molten polymeric material from a polymerisation reactor which is coupled to apparatus for contacting said polymeric material with liquid formulation as described.

According to a second aspect of the invention, there is provided a liquid formulation for addition to a polymeric material, said liquid formulation comprising a vehicle, an additive (for example a colourant) and an active compound added to increase the melt viscosity of the polymeric material. The active compound may therefore act as a process stabiliser and/or viscosity modifier of a polymeric material after contact of the active compound and polymeric material in a melt-processing apparatus.

Said liquid formulation may have any feature of the liquid formulation of the first aspect. It preferably comprises an anhydride, for example pyromellitic dianhydride, and a vehicle which may comprise an adipic acid polymer or derivative of an adipic acid polymer, with an adipate ester polymer being especially preferred.

According to a third aspect of the invention, there is provided the use of an active compound of the type described, for example, a multi-functional acid anhydride in a liquid formulation also comprising an additive and a vehicle, for reducing die head pressure drop when the liquid formulation is incorporated into a polymeric material in a melt-processing apparatus.

According to a fourth aspect of the invention, there is provided a product comprising a polymeric material incorporating an additive (for example a colourant), wherein said product includes one or more of the following features:

(a) a residue derived from an active compound added to increase the melt viscosity of the polymeric material. Said active material may be arranged to act as a process stabiliser and/or viscosity modifier of the polymeric material during manufacture of the product;

(b) free vehicle in the polymeric material, wherein said vehicle was used to deliver the additive to the polymeric material during manufacture of the product;

(c) a said polymeric material with mechanical properties (e.g. tensile properties such as tensile strength) close to virgin polymer. The mechanical properties being close to virgin polymeric material suitably means that the product can be made (e.g. spun) on the same apparatus and/or with substantially the same settings and/or process parameters as virgin polymer.

The polymeric material, additive and active compound may have any feature of the aforesaid described in accordance with the first aspect.

Referring to (a), said residue may be detected by extraction and then analysis of the extract, for example via mass spectrometry or a chromatographic technique. When said active compound used in the preparation of the product comprises a dianhydride, for example pyromellitic dianhydride, free acid, for example free tetra-acid, may be detected as described to confirm the use of dianhydride in the manufacture of the product. Alternatively, the free acid, for example free tetraacid may be detected by digestion of the final polymeric article followed by analysis.

Referring to (b), free vehicle, for example an adipic acid polymer or derivative of an adipic acid polymer such as an adipic ester polymer, may be detected by a suitable technique for example extraction from the product followed by mass spectrometry or a chromatographic technique.

Said active compound may improve the processing properties of the polymeric material in several ways. For example, the active compound may act by chemically combining the breakdown products caused by the trans-esterification reaction. This increase in molecular weight (and melt viscosity) may occur through the development of linear or branched polymeric species.

Preferably, said product includes at least two of features (a) to (c) and, more preferably, includes all three.

Said product of the fourth aspect is preferably a fibre, especially a polyester fibre.

Said product of the fourth aspect is preferably a film, sheet or pipe product especially a ester-containing polymer product. In one embodiment, the product may comprise a polycarbonate sheet or film.

According to a fifth aspect of the invention, there is provided an article incorporating a product of the fourth aspect. The product of the fourth aspect may be woven to define at least part of the article. The article may be a garment.

According to a sixth aspect, there is provide a method of producing a fibre, the method comprising introducing an additive into a polymeric material as described according to the first aspect and spinning the polymeric material which includes the additive to produce a fibre, suitably a substantially continuous length of fibre, for example of greater than 5 m or 10 m.

The method may include delivery of said polymeric material into an extruder directly from a reactor in which the polymeric material is produced.

Preferably, said polymeric material is a polyester, for example polyethylene terephthalate.

According to a seventh aspect, there is provided an assembly comprising:
(a) an extruder for extruding polymeric material;
(b) a receptacle containing a liquid formulation as described according to the first aspect;
(c) injection means operatively connected to the receptacle for injecting liquid formulation extracted from the receptacle into the polymeric material in or downstream of the extruder;
(d) mixing means for mixing liquid formulation and polymeric material.

The assembly may further include a polymerisation reactor for producing said polymeric material in a polymerisation reaction, suitably from monomers, said reactor being operatively connected to the extruder for delivering polymeric material from reactor to extruder.

The assembly may further comprise spinning means downstream of the extruder and injection means for receiving polymeric material which has been contacted with said liquid formulation and spinning the polymeric material to produce fibre.

Any invention described herein may be combined with any feature of any other invention or embodiment described herein mutatis mutandis.

Specific embodiments of the invention will now be described, by way of example, with reference to FIG. 1 which is a schematic representation of a pilot fibre line.

The following materials are referred to hereinafter:

Pyromellitic anhydride (PMDA)—in powder form obtained from Lonza Calif.

Edenol-1215—an adipate ester polymer liquid vehicle (typically used in plasticising applications) obtained from Emery Oleochemicals.

Cithrol 2DE—a PEG diester polymer liquid vehicle.

C93 PET—with IV±0.02 dl/g typically used in bottle applications. This material gives fibre with adequate physical properties for analysis and comparison between the effects of different additives. mp 247° C. and $T_g$ 78° C.

Referring to the examples hereinafter, example 1 (i) defines the preparation of a concentrate which may be let down to prepare formulations B and C described in examples 1 (ii) and (iii).

EXAMPLE 1

Preparation of Formulations A to D (i) 4 kg of pyromellitic dianhydride (Lonza Calif.) was mixed under high shear with 6 kg of adipate ester polymer (Edenol-1215) before being milled using 70% loaded 0.8 mm beads until the required particle size was achieved. A particle size of ~10 μm was required for the formulations described below for example to increase shelf-life of formulations and prevent sedimentation during storage.

(ii) Preparation of Formulation B

Formulation B had 42 g of EDENOL-1215 added to 10.5 g of Formulation A and 47.5 g of Solvent Blue 104 followed by mixing at high speed until homogeneous. The active compound (PMDA) was present at 4.2 wt %. (As an alternative to the aforesaid, the vehicles used in formulations A and B may be different.)

(iii) Preparation of Formulation C

Formulation C had 43.5 g of EDENOL-1215 added to 12.5% of Formulation A and 43 g of Solvent Blue 104 followed by mixing at high speed until homogeneous. The active compound (PMDA) was present at 5 wt %.

(iv) Preparation of Formulation D 5 kg of pyromellitic dianhydride (Lonza) was mixed under high shear with 5 kg of a PEG diester (Cithrol 2DE) polymer before being milled using 70% loaded 0.8 mm beads until the required particle size was achieved. A particle size of ~10 μm was required for the formulations described below. (Although no specific examples of use of this formulation are described herein, it may be used as for formulations B and C).

EXAMPLE 2

General Methods for Incorporation of Formulations into PET for Fibre Production

Apparatus for use in the methods is shown in FIG. 1 which shows a hopper 1 for feeding additive, at the feedthroat, into an extruder containing PET. Alternatively, additive may be injected into the PET melt at position 2, using injection apparatus 4. Die head pressure may be assessed at positions 3. The mixture is spun via spinning head 6.

In the examples described below, the liquid formulations were incorporated into PET fibre using two methods; at the feedthroat and via melt-injection In each case a pilot fibre line was used (FET pilot line serial number C0037) using a Single Screw ø30 mm L/D Ratio 24:1 with removable mixing tip' compression Ratio 2.5:1 at a throughput of 3 kg/h using a 72 hole spinneret at a draw ratio of 3:1 with roller speeds of 300 m/min (bottom) 600 m/min (middle) 900 m/min (top). This gave a final fibre diameter of ~20 μm.

Liquid formulations were added to the melt stream (position 2) using a Netzsch Nemo High Pressure Pump calibrated using a CM3000 controller unit. The formulations were dosed through high pressure braided cable into the injection system and then mixed into the melt stream using a cavity transfer mixer.

The liquid formulations were added to the extruder at the feedthroat (position 1) on a laboratory scale by manually coating a set amount of polymer pellets with the formulation and mixing to provide evenly coated pellets. These coated pellets were added to the hopper at the feedthroat. On a production scale, the mixing of liquid formulations with polymer pellets can be achieved by use of a pre-mixer.

The tensile properties of the produced fibre were measured using a Hounsfield HTE M Series Tensiometer. A 4×72 filament strand sample (135 mm long) was extended at 150 cm/min using a 100N load cell.

EXAMPLE 3

Testing of Formulations

The tensile properties of selected formulations were tested as described in Example 2. Results are provided in Table 1. "EAB" refers to extension at break.

The tensile properties of the fibre are provided in Table 1. (FT means added at Feedthroat, MI means added by melt injection):

TABLE 1

| Material Tested | Force at break/N | Tensile Strength (cN/dtex) | EAB/% |
| --- | --- | --- | --- |
| No liquid formulation added - virgin PET tested | 46.4 | 1.5 | 45 |
| Formulation comprising 1 wt % of vehicle (Edenol 1215) only added at feedthroat | 22.9 | 0.7 | 68 |
| 2 wt % of Formulation B added at the feedthroat. | 39.1 | 1.3 | 65 |
| 3 wt % of Formulation B added at feedthroat. | 44 | 1.5 | 54 |
| 2 wt % of Formulation B added by melt-injection. | 45.9 | 1.5 | 58 |
| 3 wt % of Formulation B added by melt-injection. | 46.5 | 1.6 | 59 |

Results in Table 1 show that adding vehicle alone causes a significant drop in the tensile strength of the formed fibre and the elongation at break increases substantially. Addition of formulation B causes a recovery in the tensile strength value and also a stiffening of the fibre back towards that of the virgin polymer. This positive effect was observed when the active material was added both at the feedthroat and also via melt injection.

EXAMPLE 4

Preparation of Masterbatches

These were prepared by standard processes which involved extruding a selected dye (Solvent blue 104 and Solvent Red 135) with a selected PET followed by pelletization using a Prism TSE 24 Twin Screw Extruder with water bath and followed by pelletization with a Prism cutter. A KTRON K-SFS-24 twin screw feeder was used to add the mixture of polymer and dye to the feedthroat of the extruder. Loading level of dye: 50%.

EXAMPLE 5

Comparison of Tensile Properties of Spun Fibre Coloured Using Masterbatches or Liquid Formulations Formulations (masterbatches or liquid formulations) were dosed into PET (at the feedthroat) and fibre spun. Tensile properties were assessed. Results are provided in Table 2.

TABLE 2

| Material Tested (added at feedthroat to virgin polymer) | Force at Break/N | EAB/% |
| --- | --- | --- |
| Virgin C93 PET | 44.5 | 44 |
| PET Masterbatch comprising 50 wt % Solvent Blue 104 added at 1 wt % | 44.3 | 48 |
| PET Masterbatch comprising 50 wt % Solvent Blue 104 added at 2 wt % | 40.7 | 46 |
| PET Masterbatch comprising 50 wt % Solvent Blue 104 added at 3 wt % | 38.1 | 39 |
| Formulation C added at 1.075 wt % | 44.8 | 45 |
| Formulation C added at 2.15 wt % | 43.5 | 49 |
| Formulation C added at 3.25 wt % | 41.9 | 49 |

As the amount of masterbatch added is increased, the force at break values decrease. A decrease is also observed of the elongation at break. The red masterbatch samples also demonstrate the same trends in behaviour.

The force at break values of the liquid system are higher than the masterbatch at the equivalent dye loading. The elongation at break values are also higher and remain closer to that of the virgin material than the masterbatch. The force at break values are linked to the strength of the yarn sample. A drop in force at break value equates to a weaker fibre which could break when the forces that are used during spinning and processing are applied. A low elongation at break value is not desirable as the yarn tends to be elongated during the secondary draw processes and could snap if the value falls too low. A high elongation at break value usually equates to a stretchy but weak fibre which can cause problems during processing. A force at break and elongation at break value that is approximately the same as virgin material is an advantage over an additive that has a significant impact on the physical properties of the fibre.

EXAMPLE 6

Comparison of Die-Head Pressure of Formulations

A Dynisco" PT4624-5M-6/18 probe was inserted into the polymer melt after the melt pump, for example at one of positions 3 (FIG. 1), but before the spinneret to obtain the die head pressure values.

A series of ratios of EDENOL-1215 to PMDA were made using the procedure described in Example 1 and the following results obtained

| Amount of EDENOL-1215 (wt %) in formulation | Amount of PMDA (wt %) in formulation | Die-head pressure (DHP) change/bar (compared against virgin) |
|---|---|---|
| 0 (Virgin) | 0 | 0 |
| 2 | 0 | −37 |
| 2 | 0.1 | −31 |
| 2 | 0.2 | −27 |
| 2 | 0.3 | −2 |
| 2 | 0.4 | 10 |

The ratio of vehicle (e.g. EDENOL) to chain extender (PMDA) is important in optimising the effect of the chain extender. Addition of too little chain extender in relation to the vehicle does not offset the effect of the vehicle itself in reducing molecular weight of the PET. Addition of too much chain extender causes significant stiffening of the PET fibre until the process becomes unworkable.

Based on the results, it can be concluded that a vehicle: PMDA ratio of between 1 and 100, more preferably between 1 and 40 and most preferably between 5 and 7 results in a recovery in the DHP versus when the pure vehicle is added to the polymer.

Although the formulations referred to in this example do not include colourant, studies by Applicant have shown that dyes affect the polymer to a much lower extent than the effect of the vehicle.

EXAMPLE 7

Assessing Ranges

A workable range has been developed. The formulation 'window' is relatively narrow as quite quickly the vehicle causes significant processing problems. The addition of PMDA does cause recovery of the processing parameters but at a certain formulation addition rate, the lubricating effect of the vehicle outweighs the impact of the PMDA to stabilise the extrusion and spinning processes.

The table below describes the examination (or production) of process stability using different ratios of EDENOL1215: PMDA, wherein: ✓=ran successfully, X=filament breakage, ≠=excessive screw slip.

| | | \multicolumn{8}{c}{PMDA added (%)} | | | | | | | |
|---|---|---|---|---|---|---|---|---|---|
| | | 0 | 0.1 | 0.2 | 0.3 | 0.4 | 0.5 | 0.6 | 0.7 |
| EDENOL added (wt %) | 1 | ✓ | ✓ | ✓ | X | X | X | X | X |
| | 2 | ✓ | ✓ | ✓ | ✓ | ✓ | X | X | X |
| | 3 | ≠ | ✓ | ✓ | ✓ | ✓ | X | X | X |
| | 4 | ≠ | ≠ | ≠ | ≠ | ≠ | ≠ | ≠ | ✓ |

Other features relevant to embodiments of the invention are discussed below.

(i) Particle Sizes of PMDA

The PMDA has a melting point of 286° C. and, accordingly, it must melt before it is able to react to increase the melt viscosity of the polymeric material. Assuming that the anhydride reacts as soon as it has melted, reducing the particle size down increases the speed at which the anhydride melts into the polymer, thereby increasing the speed at which it begins to react. The particle size may be less than 100 micron, is preferably less than 50 micron, is more preferably less than 20 micron and, in the most preferred form, is less than or equal to 10 microns. This gives a reaction time of ~3 minutes. Reduced particle size also imparts increased shelf-life to the liquid formulation as it prevents settling out of the particulates.

Particle size is assessed by measuring the maximum particle size of a sample visually through a microscope analysis. A small sample of product is diluted with the major vehicle of the formulation in a test tube. The sample is then assessed visually at 200× magnification and the maximum particle size on the slide is measured. If the maximum measured particle size exceeds the specification, then processing continues until the specification is reached.

(ii) Residence Time

Ideally the residence time should be as short as possible to limit the time at which the liquid vehicle remains at the elevated polymer melt temperature. Residence time ($\tau_R$) is the time at which the liquid formulation is held at the polymer processing temperature. In the case of feedthroat addition, this is assumed to occur when the polymer pellets (coated with formulation) enter the extruder, until the point of exit through the spin head where cooling is applied. In the case of melt injection, this is assumed to be once the liquid formulation is injected into the polymer stream until the point of exit through the spin head where cooling is applied. The residence time for melt injection is significantly shorter than that by addition at the feedthroat. Residence time should be less than 20 minutes, ideally less than 10 minutes and most preferably less than 5 minutes. The residence time, however, is typically dictated by equipment set up and configuration.

(iii) Viscosity of Liquid Formulation

The liquid formulation should have a viscosity of 100,000 cP and 1,000 cP, more preferably between 50,000 cP and 2,000 cP and most preferably between 5,000 and 30,000 cP as measured using a Brookfield viscometer using spindle number 7 at room temperature at ~50% torque. The formulation is suitably both pumpable and stable to sedimentation of any solid particulates that may be present.

(iv) Fuming

Volatility of carrier vehicles was assessed by using a thermogravimetric analysis device where the carrier systems were heated and held at a maximum temperature for a set period of time. This hold time was used to model the residence time of the liquid formulation in a given process and gave an indication as to the level of fuming that would be observed. A higher weight loss corresponds to an increased level of expected fuming. A weight loss of <25% when held at 280° C. for 20 minutes is preferred for carriers suitable for this type of application.

(v) Compatibility

To test for vehicle compatibility in PET, a given amount of vehicle is moulded into PET (C93) using a BOY 22M with two step plaque mould (26 mm profile) using the following parameters:

Temps ° C.—285, 280, 275, 275

Screw speed—300 rpm

Back Pressure—50 BAR

Max injection pressure—160 BAR

The resulting plaques are measured for % haze on a Minolta CM-3700d spectrophotometer using the spectromatch haze program (ASTM D1003), which involves flashing the thin part of the plaque against a white and black background to obtain a % haze figure:

| Vehicle Added to PET | Amount of vehicle added wt % | Haze Level/% |
|---|---|---|
| Edenol 1215 | 1 | 3.8 |
| 1-Decene Hydrogenated homopolymer | 1 | 93.5 |

Compatible vehicles give a haze figure of <50% at 1 wt % addition level and typically can be added at levels of up to 3 wt % before >50% haze can be detected. Incompatible vehicles typically give a high % haze value even at low addition rates—as highlighted above.

EXAMPLE 8

Analysing Spun Fibre

The spun fibre may be analysed to show whether or not it has been made in processes and/or using materials described herein. For example, if PMDA is used it may create branch points. These additional branch points compared with virgin PET can be detected using techniques such as GPC-SEC. PMDA use may also decrease the crystallinity within the fibre structure and therefore result in a decrease in tenacity compared with virgin material. XRD and SAXS can also be used to examine the degree of crystallinity present in fibre. Therefore the use of active compounds (e.g. PMDA) added to increase melt viscosity can be determined. Extraction and then analysis via mass-spectrometry or some other chromatographic technique to detect the presence of residual species: e.g. the free tetra-acid (by-product of the PMDA following reaction with any water) and/or free vehicle can also be used to determine the use of these species during the production process.

The fibre product could also be digested to look for the tetra-acid species which would be present if a process stabiliser such as PMDA were used in manufacture.

Furthermore, the incorporation of a branch-creating species such as PMDA can influence the fibre orientation uniformity. Fibre orientation uniformity can be assessed by analysing the spun birefringence level. Orientation uniformity influences yarn strength therefore the tensile properties of yarn in unweaved/knitted state and some impact on the final product properties.

The process of addition and formulation requirements outlined in this application can be applied to any thermoplastic condensation polymer. However, it is most preferably suited to fibre grade polymers and has specific use in a process whereby the polymer is spun direct from the reactor. Polymer produced in this manner tends to have low IV (~0.65) and liquid addition causes degradation of the polymer structure which makes spinning fibre very difficult. The process and formulation outlined in this application allow recovery of the polymer characteristics and therefore spinning ability and tensile properties.

The invention claimed is:

1. A method of introducing an additive into a polymeric material comprising:
   selecting a liquid formulation comprising an additive, a vehicle and an active compound added to increase the melt viscosity of the polymeric material; and
   contacting the liquid formulation with said polymeric material in a melt-processing apparatus;
   wherein said liquid formulation includes at least 20 wt % of vehicle based on the weight of said liquid formulation;
   wherein said active compound is selected from an anhydride, epoxy, melamine, oxazoline, oxazolinone, lactams, carbodiimide, polyepoxide, isocyanate, polyacyllactam and phosphonate;
   wherein said additive is selected from colourants, stabilizers, delusterants, anti-static agents, optical brighteners, processing aids, light reflective additives, anti-soil additives, friction modifiers, anti-oxidants, insecticides and anti-flammability additives; and
   wherein said polymeric material is a polyester.

2. A method according to claim 1, wherein said polyester has an IV in the range 0.62 to 1 dl/g, before contact with said liquid formulation.

3. A method according to claim 2, wherein said additive is a dye.

4. A method according to claim 1, wherein said liquid formulation includes less than 60 wt % of said additive based on the weight of said liquid formulation.

5. A method according to claim 1, the method comprising introducing less than 10 wt % of said additive based on the weight of said liquid formulation into said polymeric material via said liquid formulation.

6. A method according to claim 1, wherein said liquid formulation includes at least 20 wt % of vehicle and 60 wt % or less of vehicle based on the weight of said liquid formulation, wherein said vehicle is selected from adipic acid polymers; derivatives of adipic acid polymers; citrates; phosphate esters; phthalates; sebacates; azelates; chlorinated paraffins with between 20-70% chlorination level; epoxidized oils; and acetylated hydrogenated castor oils.

7. A method according to claim 1, wherein the difference between the total solubility parameter of the vehicle and the polymeric material is less than 10; and/or the HLB value of said vehicle is between 1 and 22.

8. A method according to claim 1, wherein the vehicle is such that the haze is less than 50%, when measured as described in Example 7(v).

9. A method according to claim 1, wherein vehicle and polymeric material are capable of undergoing a trans-esterification reaction.

10. A method according to claim 1, wherein said active compound is a polyfunctional acid anhydride.

11. A method according to claim 1, wherein said liquid formulation is dosed into said polymeric material when the polymeric material is in a molten state, and said liquid formulation is injected at a pressure in the range 5 to 120 bar into the polymeric material, wherein a mixing means is provided for facilitating mixing of the liquid formulation and polymeric material.

12. A method according to claim 11, wherein said mixing means comprises a cavity transfer mixer.

13. A method according to claim 1, wherein downstream of the point of contact of liquid formulation and polymeric material there is provided a spinning means for spinning the polymeric material to define fibres.

14. A method according to claim 1, wherein
   said additive is a dye,
   said active compound is a multi-functional acid anhydride,
   said vehicle is an adipic acid polymer or derivative of an adipic acid polymer, and
   downstream of the point of contact of liquid formulation and polyester there is provided a spinning means for spinning the polymeric material to define fibres.

15. A method of introducing an additive into a polymeric material comprising:
- selecting a liquid formulation comprising an additive, a vehicle and an active compound added to increase the melt viscosity of the polymeric material; and
- selecting pellets of said polymeric material;
- contacting the liquid formulation with said polymeric material in a melt-processing apparatus;
- wherein said liquid formulation includes at least 20 wt % of vehicle based on the weight of said liquid formulation, wherein said vehicle is selected from adipic acid polymers; derivatives of adipic acid polymers; citrates; phosphate esters; phthalates; sebacates; azelates; chlorinated paraffins with between 20-70% chlorination level; epoxidized oils; and acetylated hydrogenated castor oils;
- wherein said active compound is selected from an anhydride, epoxy, melamine, oxazoline, oxazolinone, lactams, carbodiimide, polyepoxide, isocyanate, polyacyllactam and phosphonate;
- wherein said additive is selected from colourants, stabilizers, delusterants, anti-static agents, optical brighteners, processing aids, light reflective additives, anti-soil additives, friction modifiers, anti-oxidants, insecticides and anti-flammability additives; and
- wherein said polymeric material is a polyester.

16. A method according to claim 10, wherein said polyfunctional acid anhydride is pyromellitic anhydride.

17. A method according to claim 15, wherein said active compound is pyromellitic anhydride.

* * * * *